United States Patent
Albert et al.

(10) Patent No.: US 6,928,327 B2
(45) Date of Patent: Aug. 9, 2005

(54) PROCESS CONTROL SYSTEM

(75) Inventors: Dirk Albert, Hetzles (DE); Uwe Gerk, Frensdorf (DE); Marcel Kellner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 120 days.

(21) Appl. No.: 10/473,876
(22) PCT Filed: Mar. 20, 2002
(86) PCT No.: PCT/DE02/01011
§ 371 (c)(1),
(2), (4) Date: Oct. 2, 2003
(87) PCT Pub. No.: WO02/079884
PCT Pub. Date: Oct. 10, 2002

(65) Prior Publication Data
US 2004/0122532 A1 Jun. 24, 2004

(30) Foreign Application Priority Data
Apr. 2, 2001 (DE) .......................... 101 16 435

(51) Int. Cl.[7] .......................... G05B 15/02; G05B 19/00
(52) U.S. Cl. .......................... 700/83; 700/2; 700/9; 709/218
(58) Field of Search .......................... 700/2, 3, 9, 83, 700/96, 197, 234; 715/738, 740; 709/203, 217, 218, 246

(56) References Cited

U.S. PATENT DOCUMENTS 6,311,101 B1 * 10/2001 Kastner ...................... 700/197
2001/0018627 A1 * 8/2001 Leatherman et al. ........ 700/234
2003/0122866 A1 * 7/2003 Yook .......................... 715/738
2003/0139821 A1 * 7/2003 Papadopoulos et al. ........ 700/9

FOREIGN PATENT DOCUMENTS

| DE | 19615190 | 10/1997 |
|----|----------|---------|
| DE | 19826169 | 12/1999 |
| EP | 0916466 | 11/1997 |
| EP | 0822473 | 2/1998 |
| EP | 0964325 | 12/1999 |
| EP | 0967766 | 12/1999 |
| WO | WO9726587 | 7/1997 |
| WO | WP9913418 | 3/1999 |

* cited by examiner

Primary Examiner—Leo Picard
Assistant Examiner—Steven R. Garland
(74) Attorney, Agent, or Firm—Harness, Dickey & Pierce, P.L.C.

(57) ABSTRACT

The process control system includes at least one master computer, at least one master system bus and at least one communication network, where the communications network is physically decoupled from the master system bus. The master computer is connected both to the master system bus and to the communications network and enables data exchange between the systems using Internet browser technology. At least one technical facility that is to be controlled can thus be advantageously controlled both by the master computer and by at least one computer connected to the communications network.

5 Claims, 2 Drawing Sheets

PROCESS CONTROL SYSTEM

Figure 1:
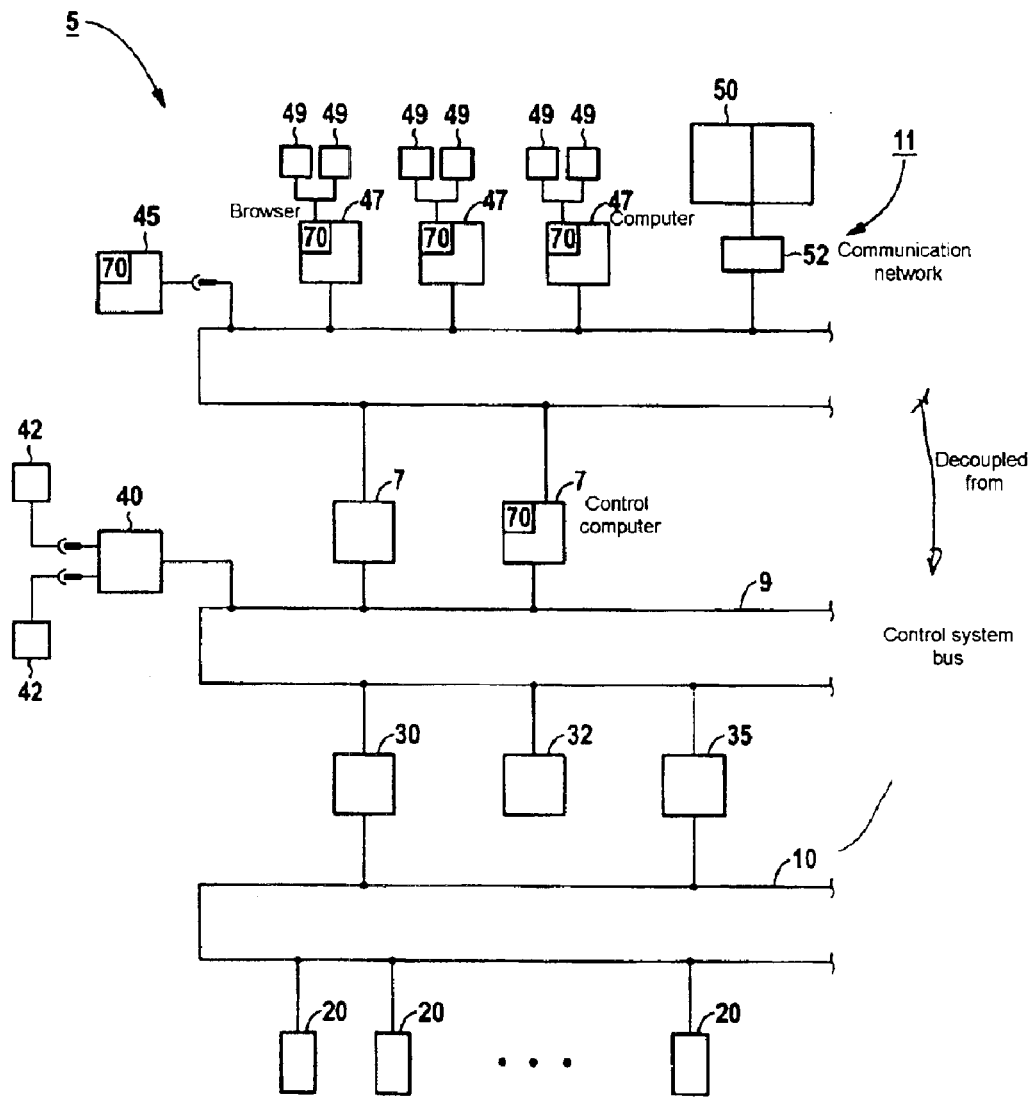

This application is the national phase under 35 U.S.C. § 371 of PCT International Application No. PCT/DE02/01011 which has an International filing date of Mar. 20, 2002, which designated the United States of America and which claims priority on German Patent Application number DE 101 16 435.1 filed Apr. 2, 2001, the entire contents of which are hereby incorporated herein by reference.

BACKGROUND ART

In many modern technical installations, process control systems are used to make operation of the respective installation as safe as possible and to alternate as many functions of the technical installation as possible.

If, in past times, a large number of people were still entrusted with the operation of a technical installation, then today the same spectrum of task is covered by a much smaller number of people, assisted by a process control system which informs the operating personnel of the operating state and receives and automatically executes commands which are to be executed, one command being able to comprise a number of subcommands.

In the course of time, so many tasks originally aimed at humans have been transferred to the process control system that the number of operators required to operate a technical installation has decreased steadily over time.

Process control systems used previously were normally in the form of computer systems which have been developed specifically for process control and which executed software developed on an individual basis for the respective instance of use, which meant that the operation of such a system was reserved for specialists who not only had to be exactly familiar with the operation of the technical installation to be controlled but also had to undergo comprehensive training in the operation of such a special process control system.

In the course of time, although process control systems appeared which were developed by various manufacturers and where respectively standardized on a manufacturer-specific basis, which meant that operating personnel for one technical installation could also be employed for another technical installation controlled using a similar process control system, the operation of such process control systems also required the use of a normally specific hardware environment and of a specifically developed software environment. Such process control systems normally cannot be operated by computers of almost any design, but require the use of specifically designed computers. In addition, the use of process control systems in technical installations up until now often require the use of a specific operating system, for example UNIX or specific further developments bases thereon, since the other operating systems widely used and known, for example the Windows operating system, used predominantly in the office environment, do not have the characteristics required for a process control system, such as speed and/or reliability and/or real-time capability.

Up until now, a user of a known process control system has therefore had to apply knowledge about the use of operating systems which are not so widely used. The user has not simply been able to fall back on knowledge which he has already possessed about widely used operating systems.

In addition, with known process control systems, it has been difficult to couple them to other computer systems, for example in order to control functions of the process control system using another computer system which has been coupled. This coupling has normally required multistage conversion of the various data formats among one another, which also required account to be taken of the usually different transmission protocols for the transmission media used. Furthermore, such couplings have needed to be planned and implemented separately for each individual instance of application in practice. Every such coupling has been an individual solution in practice.

A particular difficulty has been coupling systems described previously, particularly if these systems have run under different operating systems and/or have used data transmission media having different characteristics and/or if various transmission protocols have needed to be matched to one another.

The company brochure web4txp, Siemens AG, published in 2000, describes a process control system which can be connected to the Internet and can be operated using the Internet.

A process control system of such design allows the operating personnel to control a technical installation using a personal computer (PC) which runs under a widely used operating system, for example Microsoft Windows, and which additionally needs to hold just an "Internet browser", in principle. Internet browsers are very widely used and are accordingly known to a large number of people, not just from relevant technical circles.

To be able to operate a technical installation, an operator therefore no longer has to acquire extensive special knowledge about the operation of a specific process control system, but rather can operate the technical installation by falling back on knowledge which he normally already has, for example the operation of a (standard) Internet browser whose functionality is already known to a very large number of people today.

Such a process control system contains a separate Internet server which connects the process control system, including automation systems, control computers and engineering computers, to an intranet and/or to the Internet.

A drawback of a process control system of such design is that, although the Internet server allows interplay between the two worlds—for example Windows PCs in an intranet, on the one hand, and a UNIX-based process control system, on the other—, the two cited systems continue to be self-contained, which means that, if the Internet server fails, for example, the computers in the process control system are not able to perform any functions, for example Internet access, which are beyond the functions intended and planned for the process control system. In addition, in the event of the Internet server failing, it is not possible, by way of example, to use a PC connected to the intranet to access the process control system, even though said process control system may be fully functional. Moreover, the use of a separate Internet server means an additional source of error which can result in the loss of the technical installation's control and observation functions using a PC connected to the intranet.

In addition, such a control system does not preclude the control system buses (terminal bus, plant bus) having data applied to them which are not connected to the actual control and observation of the technical installation which is to be controlled, which means that the control system buses described can be blocked by such "foreign data" and therefore their normal functionality can be restricted or even—at least temporarily—lost.

SUMMARY OF THE INVENTION

The present invention is therefore based on an object of specifying a process control system which is above all easy and flexible to operate, which cannot be blocked by "foreign data" and which allows a technical installation to be controlled using computers which do not have to meet any special requirements with regard to the hardware and software used and which are also able to be situated at locations other than the location of the technical installation.

The present invention achieves an objective by way of a process control system having at least one control computer and at least one control system bus for controlling at least one technical installation, where a) the process control system includes at least one communication network which contains at least one computer connected thereto—particularly a bus system having one or more computers connected thereto—, with the communication network being physically decoupled from the control system bus, b) the control computer is connected firstly to the control system bus and secondly to the communication network, c) the control computer is capable of conditioning data which arise in the control system bus such that these data can be processed by the computer in the communication network using an Internet browser, d) the control computer is capable of conditioning data which arise in the communication network and which relate to the operation of the installation and are produced using an Internet browser such that the installation can be controlled by the conditioned data, and e) the installation can be controlled both using the control computer and using the computer in a communication network.

The fact that the communication network is physically decoupled from the control system bus, that is to say is in the form of a separate bus system, for example, means that the control system bus cannot have data applied to it which come from the communication network and do not relate to control of the technical installation. The functionality of the at least one control system bus is thus fully preserved, even if the communication network is blocked, or is restricted in its operation, for example as a result of vigorous data traffic prevailing there or a fault.

In addition, a process control system in accordance with the present invention may ensure that the technical installation—provided that at least one control system computer is functional—can be controlled both using the control computer and using a computer in the communication network. Operation and observation of the technical installation, for example using an intranet and/or using the Internet, are thus always ensured provided that at least one control computer is functional; it is thus not possible for the situation to arise in which, although the process control system is functional per se, operation using an intranet and/or using the Internet is not possible (even though said networks are functional).

In addition, a process control system according to the present invention allows operating personnel who are not specifically trained in operation of the process control system to carry out operation and observation actions on the control computer anyway, since said computer can condition the data relating to control of the technical installation such that they can be processed using an Internet browser, this advantageously requires a known Internet browser to be installed on the control computer only. Thus, operating personnel can easily access control system data without needing to be specifically trained in the operation of the control system. The control computer in a process control system in accordance with the present invention thus provides the operating personnel with a number of options for operating the technical installation which are able to be used according to the operating personnel's level of knowledge.

The computer in the communication network is advantageously operated using a different operating system than the control computer.

This means that it is possible to design the communication network such that operation of its computers is very simple because, by way of example, known PCs using the known operating system Microsoft Windows are advantageously used, even though, by way of example, the operating system UNIX is required for the technical installation to be controlled by the process control system. The operating personnel using the communication network in order to control the technical installation can thus fall back on knowledge which they usually already have about an operating system and/or an Internet browser.

With particular advantage, the communication network comprises at least part of the Internet and/or of an intranet.

In many companies, there is already a separate in-house computer network, an "intranet", for example. In this advantageous refinement of the present invention, it is now possible to use computers connected to this intranet in order to control the technical installation. This significantly extends the functionality of an in-house intranet, so that, besides the classical tasks of data interchange, it is now also possible to perform control tasks without needing to install new networks specifically for control tasks.

In this advantageous refinement of the present invention, it is also possible to control the technical installation using computers which are connected to the Internet. Internet access, for example over a telephone network or using satellite links, is available at a very large number of locations on earth. Thus, the existing Internet can be used to control the technical installation, which can be situated at virtually any location on earth, using a PC connected to the Internet. It is not necessary to install a separate control network for this purpose.

With particular advantage, the process control system can use the computer in the communication network to control a plurality of technical installations, which can be situated at various physical locations on earth.

In line with the present invention, these technical installations are respectively connected to an intranet and/or to the Internet, which means that the process data associated with these technical installations can be accessed from virtually any location at which intranet or intranet access is possible. The control of a plurality of technical installations from such a control center is thus possible at virtually any location without the need to install a separate data network in order to supply the control center with process data associated with the technical installation.

In summary, it can be said for all refinements of a process control system in accordance with the present invention that a very large number of activities which previously required presence in the technical installation and/or its control room can now be carried out from virtually any location using simple means, it being possible to use standard PCs with standard software (for example Microsoft Windows, Microsoft Internet Explorer, Netscape Navigator etc.).

Further scope of applicability of the present invention will become apparent from the detailed description given hereinafter. However, it should be understood that the detailed description and specific examples, while indicating exemplary embodiments of the present invention, are given by way of illustration only, since various changes and modifications within the spirit and scope of the invention will become apparent to those skilled in the art from this detailed description.

BRIEF DESCRIPTION OF THE PRESENT INVENTION

Figure 2:
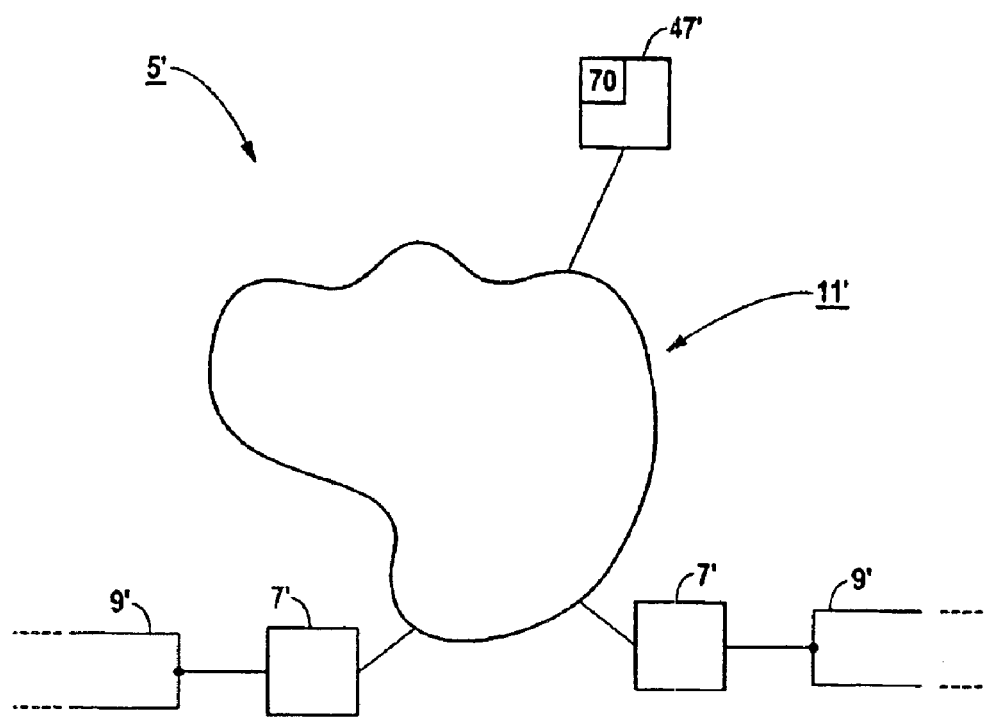

The present invention will become more fully understood from the detailed description given hereinbelow and the accompanying drawings which are given by way of illustration only, and thus are not limitative of the present invention, and wherein:

FIG. 1 shows a process control system in accordance with the present invention, where a control system bus is connected to a communication network by a control computer; and FIG. 2 shows a process control system in accordance with the present invention which allows control of the two technical installations which are at different physical locations.

DETAILED DESCRIPTION OF THE PRESENT INVENTION

FIG. 1 shows a process control system 5 in accordance with the present invention. The process control system 5 comprises two control computers 7 which are connected firstly to a control system bus 9 and secondly to a communication network 11.

In addition, the process control system 5 in the present exemplary embodiment includes a second control system bus 10. One of the control system buses 9, 10 has automation systems 20 connected to it for the purpose, by way of example, of detecting the data which arises in an installation which is to be controlled and transmitting them to the control computers 7 via the other control system bus using a processing computer 30. In addition, at least one of the control system buses 9, 10 has a database computer 32 connected to it which performs the function of a central database in the process control system 5, so that the stock of data in the process control system 5 is available at a central point and hence no problems arise with inconsistent stocks of data, which could be distributed over a plurality of computers and could relate to the operation of a technical installation.

A planning computer 35 is connected to the inventive process control system's control system buses 9, 10 such that planning data which, for example relate to operation of the technical installation and/or to the design and/or function of the process control system 5, can be transmitted both to the control computers 7 and to the automation systems 20. Hence, in the present exemplary embodiment, the planning computer 35 provides a central computer from which planning personnel entrusted with providing functionality in the process control system 5 can transfer data to all fundamental destination units—primarily the control computers 7 and the automation systems 20. Thus, by way of example, changes which relate to the planning of the control computers 7 and/or the automation systems 20 can be made from this planning computer 35 without the need for the operating personnel to make their way directly to the installation site of the aforementioned systems. This also prevents inconsistent planning data stocks from arising.

A coupling unit 40 can also be used to connect mobile planning computers 42, so that the location of the planning of the process control system 5 can be moved to any point in the technical installation at which it is possible to access at least one control system bus 9, 10.

The control computers 7 contain implementations of the fundamental functions provided by the process control system 5 for the purpose of controlling the technical installation. The control computers 7 can be provided with screens, so that the technical installation is particularly easy to control from the control computers 7.

In addition, the control computers 7 are capable of conditioning data which arise in at least one control system bus 9, 10 such that these data can be processed by one or more computers 47 in the communication network 11 using an Internet browser 70. This means that fundamental functions of the process control system 5 can thus also be controlled by computers other than the control computers 7, in which special process control system software is normally implemented. In addition, the present exemplary embodiment allows the technical installation to be controlled in two different ways on that control computer 7 which also has an installed Internet Browser: First, the operating personnel can use said control computer 7 to control the installation by using the process-control-technology special software implemented in this control computer 7 and using said software's opportunities for data input and data output and also for data transfer, following education and training at an appropriate time beforehand. In addition, this control computer 7 also provides the opportunity to access at least part of the functionality of the process control system 5 using the Internet Browser 70. This means that operating personnel who choose this control option normally require no such specific training in the process control technology functionality and operation, since the use of a (standard) Internet browser 70 is usually already known. It is thus possible that the training requirement for operating the process control system 5 is reduced if the option of controlling the technical installation using the Internet browser 70 is chosen.

Since the control computer(s) 7 also condition(s) data arising in at least one control system 9, 10, at least those data which relate to the operation and/or observation of the technical installation, so that they can be read by an Internet browser, and transmit the data to a communication network 11 which is physically decoupled from the control system bus(es) 9, 10—that is to say, by way of example, is designed separately as a bus system which can also contain such data as do not relate to control of the technical installation—, it is possible to control the technical installation using control terminals 47, for example standard PCs with the operating system Microsoft Windows and an installed (standard) Internet browser 70. Data which arise in the communication network 11 and which relate to operation of a technical installation and are generated using the Internet browser 70 are conditioned by the control computer(s) 7 such that the installation can be controlled by the conditioned data. It is also possible for one or more mobile control terminals 45 with an installed Internet browser 70 to be provided which can likewise operate the technical installation. Normally, the control terminals 47 are connected to one of the plurality of screens 49, so that any work on these control terminals 47 have optimum visual support. In the present exemplary embodiment, a large screen unit 50 is also provided which is coupled to the bus in a communication network 11 by way of an image split computer. Such a large-image system is particularly suitable for allowing, by way of example, operating states of the technical installation to be read even at a long distance from the screen unit 50.

The communication network 11 does not need to be situated close to the technical installation which is to be controlled. By way of example, it can also include at least part of an in-house intranet and/or part of the Internet, so that the location of the operation and/or maintenance and/or planning of a technical installation can be moved to virtually any location on earth at which the communication network 11 can be accessed.

The control terminals 47 and the mobile control terminal(s) 45 can also contain, besides the Internet browser 70, virtually any desired software packages, for example word processing programs, spreadsheet programs, cost management programs, warehousing programs, company management programs etc. This is often the case, by way of example, with in-house intranets, in which a number of computers are connected together which interchange data with one another and run every type of program. The bus system in the communication network 11 can thus receiver virtually any type of data, that is to say particularly a sometimes very large volume of data which does not relate to the operation and/or observation of the technical installation. Since the communication network 11 is decoupled from the control system bus 9, such data which are "foreign to the process control system" cannot impair the operation of the process control system 5, since such "interfering" data remain limited to the communication network 11 and cannot block the control system bus 9.

FIG. 2 shows a process control system 5' which includes a communication network 11'. By way of example, the communication network 11' can be in the form of a "wide area network" (WAN), which normally extends over a relatively large physical area, or in the form of at least part of the Internet, which extends virtually over the entire earth.

The inventive process control system 5' allows control of two technical installations, illustrated by way of example, which each have at least one control computer 7' and at least one respective control system bus 9'. The control computers 7' in the two technical installations condition the data which arise in a respective control system buses 9' such that they can be processed by a control terminal 47' in the communication network 11' using an Internet browser. In addition, the control computers 7'in the two technical installations are respectively capable of conditioning data which arise in the communication network 11' and which relate to the operation of at least one of the technical installations and are generated using the Internet browser 70 such that the technical legislation in question can be controlled by the conditioned data.

In this way, it is possible for a plurality of—in the present exemplary embodiment two—technical installations which are situated at different physical locations to be controlled using a control terminal 47' which includes an Internet browser 70.

In addition, the two technical installations can be controlled both using the control terminal 47' and using the at least one control computer 7' associated with the respective installation.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A process control system, comprising
at least one control computer and at least one control system bus for controlling at least one technical installation, wherein
the process control system includes at least one communication network having at least one computer connected thereto via at least a bus system, the communication network being physically decoupled from the control system bus,
the control computer is connected both to the control system bus and to the communication network,
the control computer is capable of conditioning data which arise in the control system bus such that the data can be processed by the computer in the communication network using an Internet browser,
the control computer is capable of conditioning data which arise in the communication network and which relate to the operation of the installation and are produced using an Internet browser such that the installation is controllable by the conditioned data, and
the installation is controllable both using the control computer and using the at least one computer in a communication network, the installation being able to be controlled in at least two ways using the computers, the control being provided by using process control system software using one of at least input and output technology on the control computer, and by using a further Internet browser, both the process control system software and the further Internet browser being installed on the control computer.

2. The process control system as claimed in claim 1, wherein the computer in the communication network is operated using a different operating system than the control computer.

3. The process control system as claimed in claim 1, wherein the communication network includes at least part of one of the Internet and an intranet.

4. The process control system as claimed in claim 3, wherein the process control system uses the computer in the communication network to control a plurality of technical installations which are situated at various physical locations.

5. The process control system as claimed in claim 2, wherein the communication network includes at least part of one of the Internet and an intranet.

* * * * *